US008774165B2

(12) United States Patent
Socaciu

(10) Patent No.: US 8,774,165 B2
(45) Date of Patent: Jul. 8, 2014

(54) END-TO-END INTERNET CONNECTIONS ESTABLISHMENT

(76) Inventor: Michael Socaciu, Westford, MA (US)

( * ) Notice: Subject to any disclaimer, the term of this patent is extended or adjusted under 35 U.S.C. 154(b) by 828 days.

(21) Appl. No.: 12/454,161

(22) Filed: May 13, 2009

(65) Prior Publication Data

US 2009/0296692 A1 Dec. 3, 2009

Related U.S. Application Data

(60) Provisional application No. 61/056,852, filed on May 29, 2008.

(51) Int. Cl.
*H04L 12/66* (2006.01)
*H04L 29/12* (2006.01)
*H04M 7/00* (2006.01)

(52) U.S. Cl.
CPC ......... *H04M 7/0057* (2013.01); *H04L 61/1535* (2013.01); *H04L 61/157* (2013.01); *H04L 61/106* (2013.01); *H04L 29/12896* (2013.01); *H04L 29/1216* (2013.01); *H04L 29/12122* (2013.01); *H04L 61/1547* (2013.01); *H04L 29/12103* (2013.01); *H04L 61/605* (2013.01)
USPC ........................................ 370/352

(58) Field of Classification Search
None
See application file for complete search history.

(56) References Cited

U.S. PATENT DOCUMENTS

| | | | |
|---|---|---|---|
| 6,282,281 B1 * | 8/2001 | Low | 379/230 |
| 6,904,038 B1 * | 6/2005 | Moon et al. | 370/353 |
| 2004/0192265 A1 * | 9/2004 | Warmus et al. | 455/414.1 |
| 2005/0216586 A1 * | 9/2005 | Greve | 709/225 |
| 2007/0206566 A1 * | 9/2007 | Bennett | 370/352 |
| 2009/0209241 A1 * | 8/2009 | Karaoguz et al. | 455/415 |

* cited by examiner

*Primary Examiner* — Minh-Trang Nguyen
(74) *Attorney, Agent, or Firm* — Kenneth F. Kozik

(57) ABSTRACT

Methods and apparatus, including computer program products, for signaling in a network. A method of signaling in a network includes determining in a first end station a destination telephone network address of a second end station and determining in the first end station an intermediate Internet address corresponding to the destination telephone network address. In response to determining the intermediate Internet address, the method retrieves an Internet address of the second end station from an address list at the intermediate Internet address and establishes an end-to-end Internet connection between the first end station and the second end station with the Internet address of the second end station.

15 Claims, 4 Drawing Sheets

100

Determine in a first end station
a destination telephone network address of
a second end station
102

Determine in the first end station
an intermediate Internet address
corresponding to the destination
telephone network address
104

Retrieve an Internet address of the
second end station from an address
list at the intermediate Internet
address
106

Establish an end-to-end Internet connection
between the first end station and the second
end station with the Internet address of the
second end station
108

| device/service | : | ip_address:port |
|---|---|---|
| 978 692 0001 | : | ip_address_0 : port_0 |
| 978 692 0002 | : | ip_address_1 : port_1 |
| . | | |
| . | | |
| . | | |
| my_vmbox | : | ip_address_n : port_n |
| my_e-mail | : | ip_address_e : port_e |
| . | | |
| . | | |
| . | | |

FIG. 2

| Phone# | website | ip_address:port |
|---|---|---|
| 978 692 0001 | www.smith.com | ip_address_x: port_x |
| 978 392 007 | www.joyce.com | |
| 617 247 1234 | www.mclaughlin.net | |
| Mike | mikesdomain.net | ip_address_z: port_z |

Determine in a first end station
a destination telephone network address of
a second end station
102

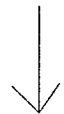

Determine in the first end station
an intermediate Internet address
corresponding to the destination
telephone network address
104

Retrieve an Internet address of the
second end station from an address
list at the intermediate Internet
address
106

Establish an end-to-end Internet connection
between the first end station and the second
end station with the Internet address of the
second end station
108

Determine in a first end station a destination
Internet address of a second Internet end station
from a local list of destinations
202

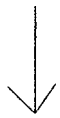

Determine in the first end station an intermediate
Internet address corresponding to
the destination Internet address
204

Retrieve an Internet address of the
second end station from an address list
at the intermediate Internet address
206

Establish an end-to-end Internet connection
between the first end station and the second
end station with the Internet address
of the second end station
208

FIG. 5

END-TO-END INTERNET CONNECTIONS ESTABLISHMENT

CROSS REFERENCE TO RELATED APPLICATIONS

This application claims the benefit of U.S. Provisional Patent Application No. 61/056852, filed May 29, 2008, and incorporated herein by reference in its entirety.

BACKGROUND

The present invention relates to mobile device networking, and more particularly to end-to-end Internet connections establishment.

A traditional cellular (e.g., wireless) telephone accesses its called party through a cellular network, which provides the traditional cellular telephone access to a circuit switched network (e.g., Public Switched Telephone Network (PSTN)), which is able to transport the voice traffic to the called party. The establishment and the maintenance of a circuit switched connection for the duration of the call is expensive.

Current technology developments in wireless communication provides mobile devices with IEEE 802.11 interfaces. IEEE 802.11 is a set of standards carrying out wireless local area network (WLAN) computer communication in the 2.4, 3.6 and 5 GHz frequency bands; they are implemented by the IEEE LAN/MAN Standards Committee (IEEE 802). At the same time the so called "hot spots", i.e., areas where the Internet can be accessed via IEEE 802.11 connections, has proliferated in public places such as airports, hotels, homes and home offices, and so forth. Current IEEE 802.11 technologies have advanced to the point where coverage from a wireless router extends to miles or tens of miles.

The advances of IEEE 802.11 technologies and WiMAX promise wireless data coverage similar to the voice cellular coverage. Here, WiMAX refers to Worldwide Interoperability for Microwave Access, which is a telecommunications technology that provides wireless transmission of data using a variety of transmission modes, from point-to-multipoint links to portable and fully mobile Internet access.

At the same time, advances in building mobile devices, smart phones and personal portable computers open unprecedented opportunities to develop networking solutions to the benefit of the end user of the basic services offered by the Internet.

SUMMARY OF THE INVENTION

The present invention provides methods and apparatus, including computer program products, for end-to-end Internet connections establishment.

In general, in one aspect, the invention features a method including determining in a first end station a telephone network address of a second end station, determining in the first end station an intermediate Internet address corresponding to the destination telephone network address, in response to determining the intermediate Internet address, retrieving an Internet address of the second end station from an address list at the intermediate Internet address, and establishing an end-to-end Internet connection between the first end station and the second end station with the Internet address of the second end station.

In another aspect, the invention features a method including determining in a first end station a destination Internet address of a second Internet end station from a local list of destinations, determining in the first end station an intermediate Internet address corresponding to the destination Internet address, in response to determining the intermediate Internet address, retrieving an Internet address of the second end station from an address list at the intermediate Internet address, and establishing an end-to-end Internet connection between the first end station and the second end station with the Internet address of the second end station.

Other features and advantages of the invention are apparent from the following description, and from the claims.

BRIEF DESCRIPTION OF THE DRAWINGS

FIG. 2 is a table.
FIG. 3 is a table.
FIG. 4 is a flow diagram.
FIG. 5 is a flow diagram.

DETAILED DESCRIPTION

Figure 1:
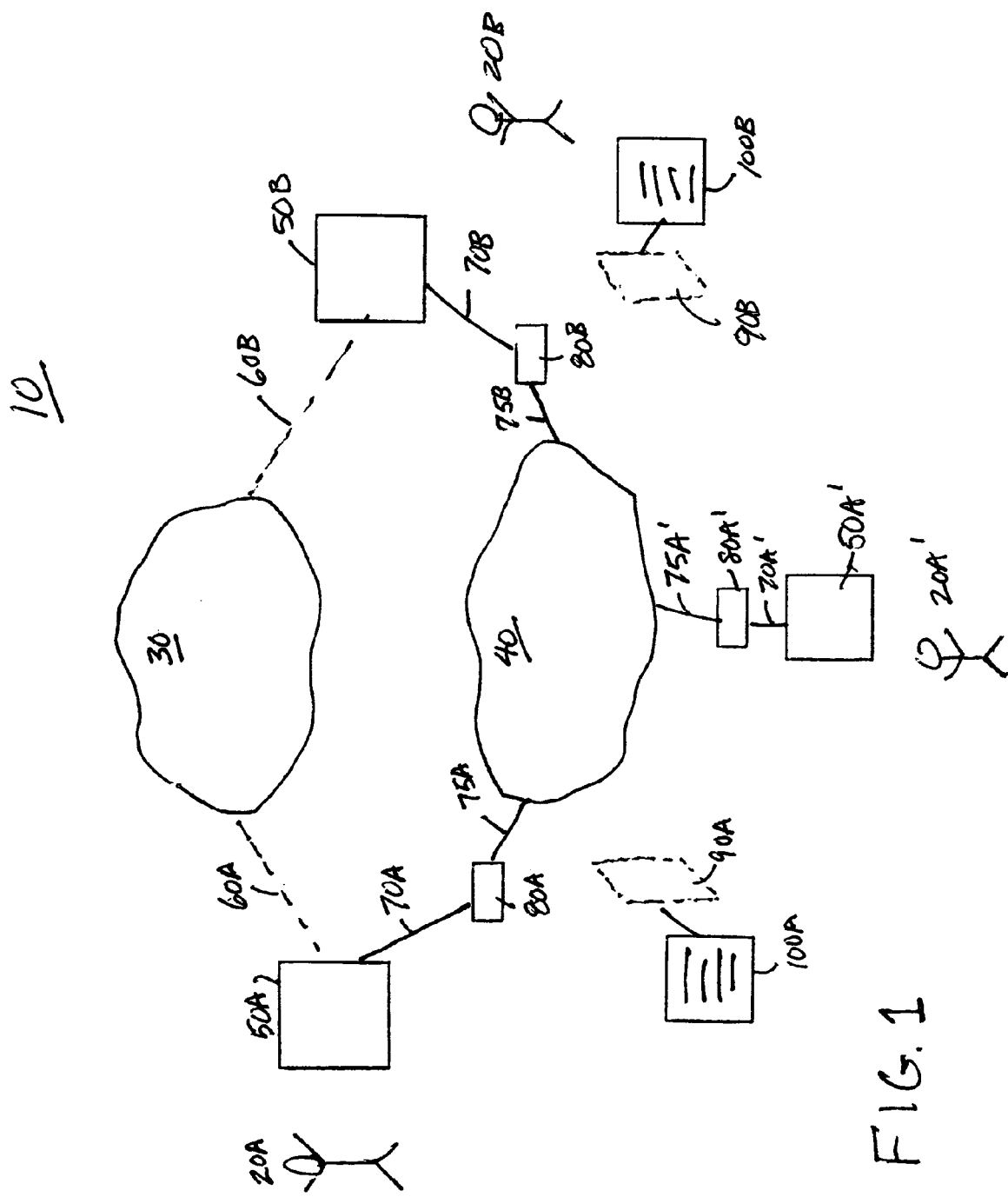
FIG. 1. is block diagram of an exemplary communication system.

As shown in FIG. 1, an exemplary communication system 10 includes mobile device owners (or users) 20A and 20B. Device owner 20A is also shown in a position 20A'. The communication system 10 enables the device owner 20A to establish end-to-end connections with other device owners, such as the device owner 20B, in several ways. To establish connections, device owners 20A, 20B subscribe to basic services of a circuit switched network 30, which can include a public switched telephone network (PSTN) accessed via a wireless cellular network and an Internet 40. The mobile devices 50A, also shown in the position 50A', and 50B, have cellular network interfaces 60A, 60B to the wireless cellular network and wireless interfaces 70A, 70A', 70B, and to wireless routers 80A, 80A', 80B, respectively. The wireless routers 80A, 80A', 80B enable Internet 40 access to the devices 50A, 50A when in the positions 50A' and 50B, respectively, through Internet broadband connections 75A, 75A' and 75B respectively.

The device owners 20A and 20B have their own websites 90A and 90B, respectively. Here, a website (or "web site") refers to a collection of related web pages, images, videos or other digital assets that are hosted on one web server, usually accessible via the Internet. The pages of a website can usually be accessed from a common root Uniform Resource Locator (URL) called a homepage, and usually reside on the same physical server. On the websites 90A, 90B there are address lists 100A and 100B, respectively.

As shown in FIG. 2, address lists 100A, 100B include a pair of Internet Protocol (IP) address and port "ip_address:port" on which mobile devices 50A, 50B and/or services located in devices 50A, 50B can be accessed. When the device owners 20A, 20B with mobile device 50A, 50B, respectively, are in the proximity of the wireless routers 80A, 80B, respectively, the devices 50A, 50B, respectively, have their wireless interfaces 70A, 70B, respectively, to the routers 80A, 80B, respectively, active. When the device owner 20A moves in the position 20A' with the mobile device 50A illustrated as 50A', the wireless interface 70A' to the router 80A' becomes active. The wireless interfaces 70A, 70A' and 70B can be any wireless interface, such as WiFi 802.11, WiMAX, Bluetooth, and so forth.

The device owners 20A, 20B execute a communication program residing in their devices 50A, 50B a communication program. This communication program running on the mobile device 50A retrieves an IP address of the router 80A when the mobile device 50A is in the proximity of the router

80A and an IP address of the router 80A', when the mobile device 50A moves to the position 50A' in the proximity of the router 80A'. To retrieve the IP address of the proximate routers, the communication program running on the mobile devices 50A, 50B use, for example, Simple Traversal of User Datagram Protocol (UDP) through Network Address Translation (NAT), i.e., STUN, Traversal using Relay NAT, i.e., TURN, or Interactive Connectivity Establishment (ICE) protocols. The communication program running on the mobile devices 50A, 50B can execute the protocols to retrieve the IP addresses of the routers when the mobile devices 50A, 50A in position 50A', 50B have their wireless interfaces 70A, 70A', 70B, respectively activated, or periodically at predetermined time intervals. Either way, after retrieving the IP address of the proximity router, the communication program running in the mobile devices 50A, 50B sets the retrieved IP address of the proximity router in the corresponding address list. More specifically, the communication program running on the device 50A retrieves the IP address of the router 80A when the device owner 20A has the device in the proximity of the router 80A. Presuming that the mobile device 50A has the subscribed wireless phone number 978 692 0001, the communication program running in the device 50A enters the record "978 692 0001 ip_address0:port0" in the address list 100A on the website 90A of the device owner 20A. ip_address0 is the IP address of the router 80A and port0 is a pre configured port on which a first device of the device owner 20A is to be connected. When the device owner 20A moves in the position 20A' his/her mobile device shown in the position 50A', the communication program running on his/her mobile device retrieves the IP address of the router 80A' and enters the record "978 692 0001 ip_address0:port0", where ip_address0 is the IP address of the router 80A'. The communication program running on the mobile devices 50A, 50B retrieves the IP addresses of the routers that provide access to the mobile devices 50A (50A'), 50B at any given moment and enters records of the current IP address that provides access to the mobile devices 50A (50A'), 50B in the corresponding address list on the website of the device owner. If a device owner has several devices, several entries are entered in the corresponding address list.

If the device owner 20A has a second mobile device with the subscribed phone number 978 692 0002, a second record is entered "978 692 0002 ip_address1:port1", where ip_address1 is the IP address or the proximity router that provides access to the mobile device at the current time and port1 is the access port for the second mobile device. In implementations, a device owner can be a group, either a family or a business office where on the corresponding website a number of records, one for each mobile device belonging to the group is entered in the address list. The address list can include records that specify ip_address:port pairs to access a voice mail box. To enter and retrieve records of the address list on a corresponding website the communication program may use, for example, Hypertext Transfer Protocol (HTTP), File Transfer Protocol (FTP), adaptations of Active Server Pages, and so forth.

As shown in FIG. 3, the communication program running in mobile devices 50A, 50A', 50B works in conjunction with a directory list built and maintained in the mobile devices 50A, 50A', 50B. The device owners 20A, 20B enter, through a user interface (UI), a set of directory records to the communication program. A directory record includes a phone number of a destination mobile device and, in implementations, the website URL of the corresponding device owner. Some directory records can include a resolved pair ipa_address:port corresponding to a destination mobile device. In this example shown, the first directory record is for the destination mobile device having the phone number 978 692 0001, owned by the device owner who has the website www.smith.com, having mobile device that can be addressed at ip_address_x:port_x.

When the device owner 20A dials the phone number 978 692 0001, the running communications program on the device 50A examines the directory list of the device 50A.

If there is no directory record entered for the phone number 978 692 0001, the device 50A may connect to the destination device via the circuit switched network 30.

If the directory record corresponding to the phone number 978 692 0001 includes a website URL, the communication program running in the device 50A accesses the address list on the website located by the URL. For example, if the mobile device 20B has the phone number 978 692 0001 and the corresponding www.smith.com website, the communication program running in the mobile device 50A retrieves from the address list found on www.smith.com the pair ip_address_0:port_0 that corresponds to 978 692 0001. The communication program running on device 50A completes the directory record in the directory list in the device 50A with the pair retrieved from the www.smith.com address list, shown as ip_address_x:port_x. The communication program running on the mobile device 50A can use the pair ip_address_x:port_x at the present time and in the future to connect to the device 20B. To connect to the device 20B, the device 20A may use, for example, the Session Initiation Protocol (SIP) to establish a direct end-to-end connection. Once the pair ip_address_x:port_x of the mobile device 20B is retrieved in the mobile device 20A, SIP or other signaling protocols can be used to establish a direct Real Time Protocol (RTP) stream between the mobile devices 20A and 20B with no server, registrar or redirector support of a service provider.

If when dialing 978 692 0001 the communication program running on the mobile device 50A finds in the directory list in the device 50A a directory record corresponding to 978 692 0001 that includes the resolved pair ip_address_x:port_x, from a previous dial event, the communication program on the device 50A proceeds directly to establish the end-to-end connection as described above.

As described above, the directory records in the directory list can be entered by the mobile device owners through a UI. For example, the mobile device owner 20A who knows the mobile device owner 20B can enter in his/her mobile device 50A the phone number of the mobile device 50B that belongs to the mobile device owner 20B along with the website URL of the mobile device owner 20B, where the corresponding address list includes the pair ip_address:port to be used to access the mobile device 20B, updated at all times and depending on the location of the mobile device 50B.

In other implementations, an administrator of a group to which the mobile device owners 20A, 20B belong can enter directory records in the corresponding mobile devices 50A, 50B. The communication programs running on the mobile devices 50A, 50B update continuously the address lists 100A, 100B on the corresponding websites 90A, 90B as the mobile device owners 20A, 20B move their mobile devices 50A, 50B around and connect to the Internet 40 via different wireless routers. At any given moment in time the address list of the website corresponding to a certain mobile device owner corresponding to a certain mobile device includes addressing information in the form of a pair ip_address:port that currently provides access to the mobile device.

If the mobile device owner 20A does not know the cellular phone number of the mobile device owner 20B and knows the website URL of the mobile device owner 20B, the mobile device owner 20A can enter in the directory list a directory record that includes the name of the mobile device owner 20B and the corresponding website URL. For example, the directory record "Mike mikesdomain.net ip_address_z:port_z" entered for a mobile device owner identified as Mike indicates the website URL where Mike's address list is updated by the communication program running in his mobile device. Any mobile device owner who has a directory record in his/her mobile device that includes Mike's website URL can have retrieved in his/her mobile device the pair ip_address:port to access Mike's mobile device, shown as ip_address_z, port_z in FIG. 3. To establish a connection to Mike's mobile device the caller does not dial Mike's phone number. Instead, the communication program running in the caller device uses a Graphical User Interface (GUI) dialog window that displays the directory list available in the caller mobile device. The caller mobile device owner clicks on Mike's directory record displayed in the GUI dialog window to establish an Internet connection to the Mike's device with access pair ip_address_z:port_z.

Mobile device owners add new destination mobile device owners to the directory lists in their mobile devices. Each mobile device owner configures and maintains his/her own directory list in his/her device. The communication program running in the mobile devices belonging to mobile device owners of the same group, family or organization, may exchange directory lists to merge directory lists into larger directory lists. Merging directory lists of mobile device owners who are members of a group in the mobile devices of the members allow for members who do not have websites. The members who do not have websites receive directory lists from the other members of the group, merge the received directory lists in larger directory lists and update the larger directory list by adding their own directory record that includes their own phone number and current pair ip_address:port to the directory list. Further, the updated list is communicated to the other members. Each member of the group can establish a direct end-to-end Internet connection to all members of the group who have their directory record in the updated directory list. Members who do not have websites can update their current pair ip_address:port access information in the accessing lists on websites of the other members of the group. Either the owners of the mobile devices who have their own websites or administrators of the group give website access rights to the members who do not have their own websites. Thus one can create groups in which one or more members have websites available that enable the other members of the group to enter addressing records in the address lists on the available websites.

Web server functionality can be implemented in powerful mobile devices. Web server applications such as Microsoft Corporation's Internet Information Service (IIS) or open source Apache can be integrated in the communication programs described above. The mobile web server application uses a dynamic Domain Name System (DNS) service to have the service locatable at all times, independent of where the mobile device that supports the website is located. Having the websites supported by web server applications that run on mobile devices enables a group of mobile device owners, at least one of them having a website supported in one of the mobile device to establish Internet connections between them, virtually operating their own mobile wireless network with no support from an Internet Telephony service provider.

As shown in FIG. 4, a communications process 100 includes determining (102) in a first end station a destination telephone network address of a second end station. In oher implementations, a destination Internet address is determined.

In implementations, the first end station and the second end station can be smart phones, cellular phones with wireless capability, personal computers (PCs) with network access and personal data assistants (PDAs) with wireless capability.

Process 100 determines (104) in the first end station an intermediate Internet address corresponding to the destination telephone network address. In implementations, the Intermediate Internet address points to a web site and the web site can belong to an owner of the first end station or an owner of the second station.

In response to determining the intermediate Internet address, process 100 retrieves (106) an Internet address of the second end station from an address list at the intermediate Internet address and establishes (108) an end-to-end Internet connection between the first end station and the second end station with the Internet address of the second end station.

As shown in FIG. 5, a communications process 200 includes determining (202) in a first end station a destination Internet address of a second Internet end station from a local list of destinations. In other implementations, a destination network telephone address is determined.

Process 200 determines (204) in the first end station an intermediate Internet address corresponding to the destination Internet address.

In response to determining (204) the intermediate Internet address, process 200 retrieves (206) an Internet address of the second end station from an address list at the intermediate Internet address and establishes (208) an end-to-end Internet connection between the first end station and the second end station with the Internet address of the second end station.

The invention can have one or more advantages. A small application executing in a smartphone or similar device with WiFi capability identifies a request to make a call and die call is either set up as a VoIP call over a public network without provider assistance or a wireless call over a private network of a cellular service provider.

Other modifications and implementations will occur to those skilled in the art without departing from the spirit and the scope of the invention as claimed. Accordingly, the above description is not intended to limit the invention except as indicated in the following claims.

What is claimed is:

1. A method of signaling in a network comprising:
   in a closed group comprising a first end station and a second end station, selecting in the first end station a destination telephone network address of the second end station from a private local list;
   determining in the first end station a private intermediate Internet address corresponding to the destination telephone network address from the private local list;
   in response to determining the private intermediate Internet address, retrieving an Internet address of the second end station from an address list at the private intermediate Internet address, the address list maintained by an owner in the closed group;
   establishing an end-to-end Internet connection directly between the first end station and the second end station with the Internet address of the second end station: and
   updating the Internet address of the second end station in the address list at the private intermediate Internet address by the second end station.

2. The method of claim 1 wherein the private intermediate Internet address points to a web site.

3. The method of claim 2 wherein the web site belongs to an owner of the first end station or an owner of the second end station.

4. The method of claim 1 wherein the private intermediate Internet address is an address of the second end station and the second end station hosts a web site that belongs to an owner of the second end station.

5. The method of claim 1 wherein the first end station and the second end station are selected from the group consisting of a smart phone, a cellular phone with data wireless capability, a personal computer (PC) with network access, and a personal data assistants (PDA) with wireless capability.

6. A method of signaling in a network comprising:
in a closed group comprising a first end station and a second end station, selecting in the first end station a destination Internet address of the second end station from a local list of destinations;
determining in the first end station a private intermediate Internet address corresponding to the destination Internet address from the local list of destinations;
in response to determining the private intermediate Internet address, retrieving an Internet address of the second end station from an address list at the private intermediate Internet address, the address list maintained by an owner in the closed group;
establishing an end-to-end Internet connection directly between the first end station and the second end station with the Internet address of the second end station; and
updating the Internet address of the second end station in the address list at the private intermediate Internet address by the second end station.

7. The method of claim 6 wherein the private intermediate Internet address points to a web site.

8. The method of claim 7 wherein the web site belongs to an owner of the first end station or an owner of the second end station.

9. The method of claim 6 wherein the private intermediate Internet address is an address of the second end station and the second end station hosts a web site that belongs to an owner of the second end station.

10. The method of claim 6 wherein the first end station and the second end station are selected from the group consisting of a smart phone, a cellular phone with data wireless capability, a personal computer (PC) with network access, and a personal data assistants (PDA) with wireless capability.

11. A computer program product, tangibly embodied on a non-transitory computer-readable medium, for signaling in a network, the computer program product being operable to cause data processing apparatus to:
select in a first end station a destination address of a second end station from a private local list, wherein the first end station and the second end station are in a closed group;
determine in the first end station a private intermediate Internet address corresponding to the destination address from the private local list;
in response to determining the private intermediate Internet address, retrieve an Internet address of the second end station from an address list at the private intermediate Internet address, the address list maintained by an owner in the closed group;
establish an end-to-end Internet connection directly between the first end station and the second end station with the Internet address of the second end station; and
update the Internet address of the second end station in the address list at the private intermediate Internet address by the second end station.

12. The computer program product of claim 11 wherein the destination address of the second Internet end station resides in a local list of destinations.

13. The computer program product of claim 11 wherein the private intermediate Internet address points to a web site.

14. The computer program product of claim 13 wherein the web site belongs to an owner of the first end station or an owner of the second end station.

15. The computer program product of claim 11 wherein the private intermediate Internet address is an address of the second end station and the second end station hosts a web site that belongs to an owner of the second end station.

* * * * *